United States Patent [19]

Cidon et al.

[11] Patent Number: 4,926,418
[45] Date of Patent: May 15, 1990

[54] FAIRNESS ALGORITHM FOR FULL-DUPLEX BUFFER INSERTION RING

[75] Inventors: Israel Cidon, New York; Yoram Ofek, Riverdale, both of N.Y.

[73] Assignee: International Business Machines Corporation, Armonk, N.Y.

[21] Appl. No.: 336,364

[22] Filed: Apr. 11, 1989

[51] Int. Cl.[5] .............................................. H04J 3/16
[52] U.S. Cl. ................... 370/85.5; 370/85.15; 370/85.12; 370/85.4; 340/825.05
[58] Field of Search .................. 340/825.05, 825.5; 370/89, 86, 90, 94, 60, 68.1, 85.4, 85.5, 85.12, 85.15, 94.1

[56] References Cited

U.S. PATENT DOCUMENTS

| | | | |
|---|---|---|---|
| 4,482,999 | 11/1984 | Janson et al. | 370/85.5 |
| 4,491,946 | 1/1985 | Kryskow, Jr. et al. | 370/85.4 |
| 4,556,098 | 1/1986 | Gammag et al. | 370/85.5 |
| 4,566,097 | 1/1986 | Bederman | 370/89 |
| 4,663,748 | 5/1987 | Karbowiak et al. | 370/85.4 |
| 4,685,105 | 8/1987 | Shikama et al. | 370/86 |
| 4,745,598 | 5/1988 | Ulug | 370/85.5 |
| 4,805,170 | 2/1989 | Fergeson et al. | 370/89 |
| 4,809,267 | 2/1989 | Higuchi et al. | 340/825.5 |

OTHER PUBLICATIONS

IBM Technical Disclosure Bulletin vol. 27, No. 11, Apr. 1985, "Data Path Controlling Mechanism".

Primary Examiner—Douglas W. Olms
Assistant Examiner—Alpus H. Hsu
Attorney, Agent, or Firm—Douglas W. Cameron

[57] ABSTRACT

The invention describes a method for transmitting data on a full-duplex buffer insertion ring. Access to the ring by each node is regulated by circulating control message around the ring. The message indicated to each node the maximum number of packets that it may transmit during the interval from the reception of one control message to the forwarding of a subsequent control message. With this invention a station need not be in possession of the control message in order to transmit a packet. A node will also hold a control message if it has not transmitted a predetermined minimum number of packets in its output buffer in a given time interval.

20 Claims, 12 Drawing Sheets

FIG.6

| 4B/5B ENCODER SCHEME | | |
|---|---|---|
| HEX DATA | 4-BIT BINARY DATA | 5-BIT ENCODED SYMBOL |
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |
| E | 1110 | 11100 |
| F | 1111 | 11101 |

FIG.8

| Am7968 TRANSMITTER | | |
|---|---|---|
| COMMAND INPUT | | ENCODED SYMBOL |
| HEX | BINARY | |
| 1 | 0001 | 11111 11111 |
| 2 | 0010 | 01101 01101 |
| 3 | 0011 | 01101 11001 |
| 4 | 0100 | 11111 00100 |
| 5 | 0101 | 01101 00111 |
| 6 | 0110 | 11001 00111 |
| 7 | 0111 | 11001 11001 |
| 8 | 1000 | 00100 00100 |
| 9 | 1001 | 00100 11111 |
| A | 1010 | 00100 00000 |
| B | 1011 | 00111 00111 |
| C | 1100 | 00111 11001 |
| D | 1101 | 00000 00100 |
| E | 1110 | 00000 11111 |
| F | 1111 | 00000 00000 |

POSSIBLE SAT CONTROL MESSAGE (rows 1–F)

FAIRNESS ALGORITHM FOR FULL-DUPLEX BUFFER INSERTION RING

TECHNICAL FIELD

This invention relates generally to a method and apparatus for transmitting packets of data on a communications ring. More specifically, this invention provides for forwarding a control message on the ring which message informs each node of the ring as to how many packets it may transmit in a given time interval, and for holding control message by each node of the ring until it has transmitted corresponding minimal number of packets without transmitting more than the number of packets it was allowed to transmit.

DESCRIPTION OF THE PRIOR ART

Many previous attempts to reduce the complexity of local area networks (LAN) focus on simple topology structures in the form of a bus, star or ring. To further simplify the architecture, most current local and metropolitan area networks do not permit concurrent access of the LAN by more than one user or spatial reuse [1,2,3,4]. With some of the LAN networks, the above restrictions are due to the passive nature of the transmission media (e.g., ethernet, passive optical star). Other designs, like the dual token ring networks (FDDI [1,2]) or dual bus networks (QPSX), have been adopted to achieve simplicity and fairness. However, there are problems associated with these solutions. First, there is no spatial reuse on these networks, and thus, only one node can transmit new data into the network at the same time. Therefore, the system throughput is smaller than the bandwidth of a single link. Second, efficiency decreases with higher bandwidth or larger physical size.

The token ring is a popular LAN structure that is based on passing a token (permit to transmit) between nodes of the ring in a round robin order. The token itself is attached to the head or tail of a transmitted message. The token ring relies heavily on the integrity of the token mechanism, and loss or duplication of the token results in a need for complete network reinitialization.

A new approach for high speed LAN in the QPSX or DQDB which has a slotted dual bus structure with centralized control [3]. With this bus structure, a fairness and access mechanism is based on having stations request empty slots and counting these requests.

Japanese patent 60-180353 discloses a token bus control system in which the token circulated in the opposite direction of data transmission. However, this patent does not provide for spatial reuse and only enables one node to transmit at a time.

Japanese patent 59-91757 and U.S. Pat. No. 4,491,946 both disclose the use of a timer to detect loss of a token wherein action is taken to pass the token to another node upon failure of the node which was originally supposed to have received the token. However, neither of the above two patents provides for spatial reuse or enables more than one user to transmit at the same time.

U.S. Pat. No. 4,566,098 to Gammage et al. discloses a ring communication network having an improved error recovery mechanism. This network uses a toggle signal wherein the change of the signal from one frame to another indicates that the ring is busy. This patent, however, does not teach the concurrent transmission of multiple nodes.

U.S. Pat. No. 4,663,748 to Karbowiak et al. discloses a communication system which uses a double ring topology with a token passing scheme. This system operates under a strict timing regime when a system cycle substantially fixed period is established and the first rotation of the token around the ring during the system cycle is used to initiate transmission of the highest transmission of the highest priority data with subsequent rotations of the token initiating the transmission of data of progressively lower priorities. With this system only the node currently holding the token is entitled to transmit data, and there is no allowance for concurrent transmission by multiple nodes.

U.S. Pat. No. 4,745,598 to Ulug discloses a dynamic logical ring in a token passing LAN. This ring has a network control center which transmits and receives information signals of the first and second transmission channels. The network control center solicits prospective entrance to the ring and resolves contention between them over the first transmission channel, while the network control center communicates with active stations over the second channel to add an entrant to the ring. This patent, however, only allows one user to access the ring at the same time.

U.S. Pat. No. 4,482,999 to Janson et al. discloses a unidirectional communication ring wherein access to the ring is granted to one station at a time by circulating token indication. The method disclosed in this patent provides for guaranteeing a transmission opportunity for synchronous or circuit-switched data in periodic time intervals to authorized stations.

Buffer insertion access control [5,6] is designed for asynchronous transmission of variable size packets. With buffer insertion, a node can transmit a packet as long as its insertion buffer is empty, i.e., the ring traffic has preemptive priority over node traffic that is to be transmitted on the ring. The buffer insertion scheme, however, can result in starvation since an up-stream node can transmit continuously and block a down stream node. None of the existing variations of buffer insertion ring protocols provide for complete fairness. A technique on how to have some measure of fairness in a buffer or register insertion ring is described in an IEEE article [7] by Mission et al. This article describes a synchronous and slotted ring with fairness and control of the ring being accomplished by a monitor station. The solution described therein, however, is centralized as opposed to being distributed.

Existing protocols, such as the token ring (IEEE Standard 802.5), ethernet (IEEE Standard 802.3), FDDI (American National Standard, ASC X3T9.5), DQDB or QPSX (IEEE Standard 802.6), do not provide for spatial bandwidth reuse, hence, the capacity of systems using these protocols would be limited by the capacity of a single link.

1. W. E. Burr, "The FDDI Optical Data Link", IEEE Communication Magazine, Vol. 24, No. 5, May, 1986, pp 18-23.

2. F. E. Ross, "FDDI-A tutorial", IEEE Communication Magazine, Vol. 24, No. 5, May 1986. pp 10-17.

3. J. L. Hullet and P. Evans, New Proposal Extends the Reach of Metro Area Nets", Data Communications, February, 1988, pp. 139-147.

4. A. Hopper and R. M. Needham, "The Cambridge Fast Ring Networking System", IEEE Trans. on Computers, Vol. 37, No. 10, October 1988, pp. 1214-1223.

5. M. T. Liu and D. M. Rouse, "A Study of Ring Networks", Proc. IFIP WG 6.4, pp 1-39.

6. D. E. Huber, W. Steinlin and P. J. Wild, "SILK: An Implementation of a Buffer Insertion Ring", IEEE J. on Selected Areas in Communications, Vol. SAC-1, No. 5, November 1983, pp. 766–744.

7. M. Mission, J-J. Mercier and A. El Oussoul, "A Fair Management of Communication for a Ring LAN", 1988 Local Computer Network Conference, pp. 395–404.

BACKGROUND OF THE INVENTION AND SUMMARY OF INVENTION

The present invention provides method and apparatus for transmitting packets on a communications ring to overcome the above mentioned problems.

It is, therefore an object of this invention to provide fairness on a buffer insertion ring so that busy nodes on the ring will transmit the same amount of packets in a given time interval.

It is also an object of this invention to provide a communications ring which is deadlock free.

It is also an object of this invention to provide a buffer insertion ring that will operate with multiple control message (SAT's).

Accordingly, the present invention provides a method book for controlling the transmission of packets from the nodes on a communications ring. This invention provides for forwarding a current control message on the ring to indicate to each of the nodes on the ring a first corresponding maximum number of packets that each node is permitted to transmit in a corresponding time interval. This invention also provides for holding a control message by each node until the node holding the control message is satisfied. Satisfaction means that the node has transmitted at least a second (equal or lower than the first) corresponding number of packets or all of the packets that it has to transmit if the number of packets that it has to transmit is less than the second corresponding number. More specifically, the time interval above is the time from when a node receives a current control message to when it forwards a subsequent control message. Again, more specifically, this invention is applied to a buffer insertion ring. With this specific application, each node will transmit packets as long as its insertion buffer contains less than a predetermined number of bits and as long as the node has not transmitted more than its first corresponding maximum number of packets during the above mentioned interval. Also, in this specific application, each node can transmit packets without having to hold any control message.

BRIEF DESCRIPTION OF THE DRAWINGS

FIG. 6 is a table illustrating a 4B/5B code for implementing the transmission of a distinct SAT message.

FIG. 8 is a table of possible control words and corresponding encoded symbols for the control message.

DESCRIPTION OF THE PREFERRED EMBODIMENT

Figure 1:
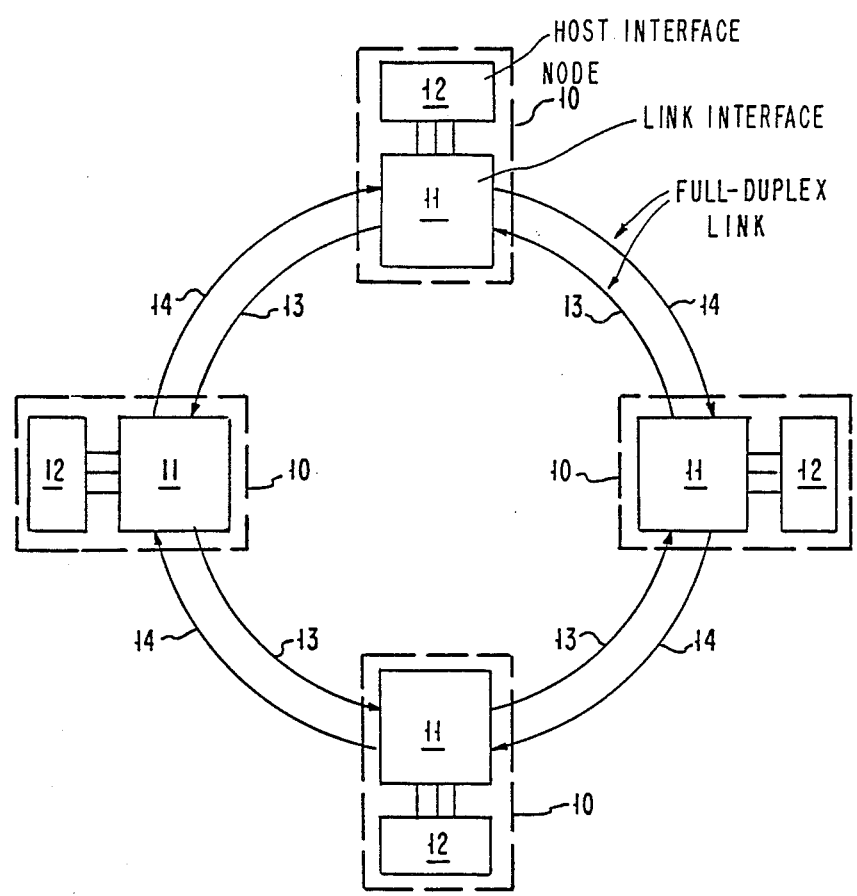
FIG. 1 is a schematic illustration of a full-duplex communications ring used in this invention.

The full-duplex buffer insertion system has a bidirectional ring topology, which has two unidirectional rings, as shown in FIG. 1. This system has switching entities called nodes 10, each containing full-duplex link interface unit 11, and a host interface 12. The full-duplex link interfaces are connected by two unidirectional links 13 and 14. Nodes can send packets to other nodes through the set of links between them. Each pair of links, 13 and 14, that connect two neighboring nodes, can be realized by a single communication medium (e.g., fiber) or by two separate communication mediums (e.g., a pair of coax cables or fibers). The transmission of a packet from source node to a destination node can be done via two possible routes: using the clockwise links 14, or the counter clockwise links 13. The packet is removed from the ring by the destination node. Nodes are named either in an arbitrary fashion or according to a linear ordering.

Figure 2:
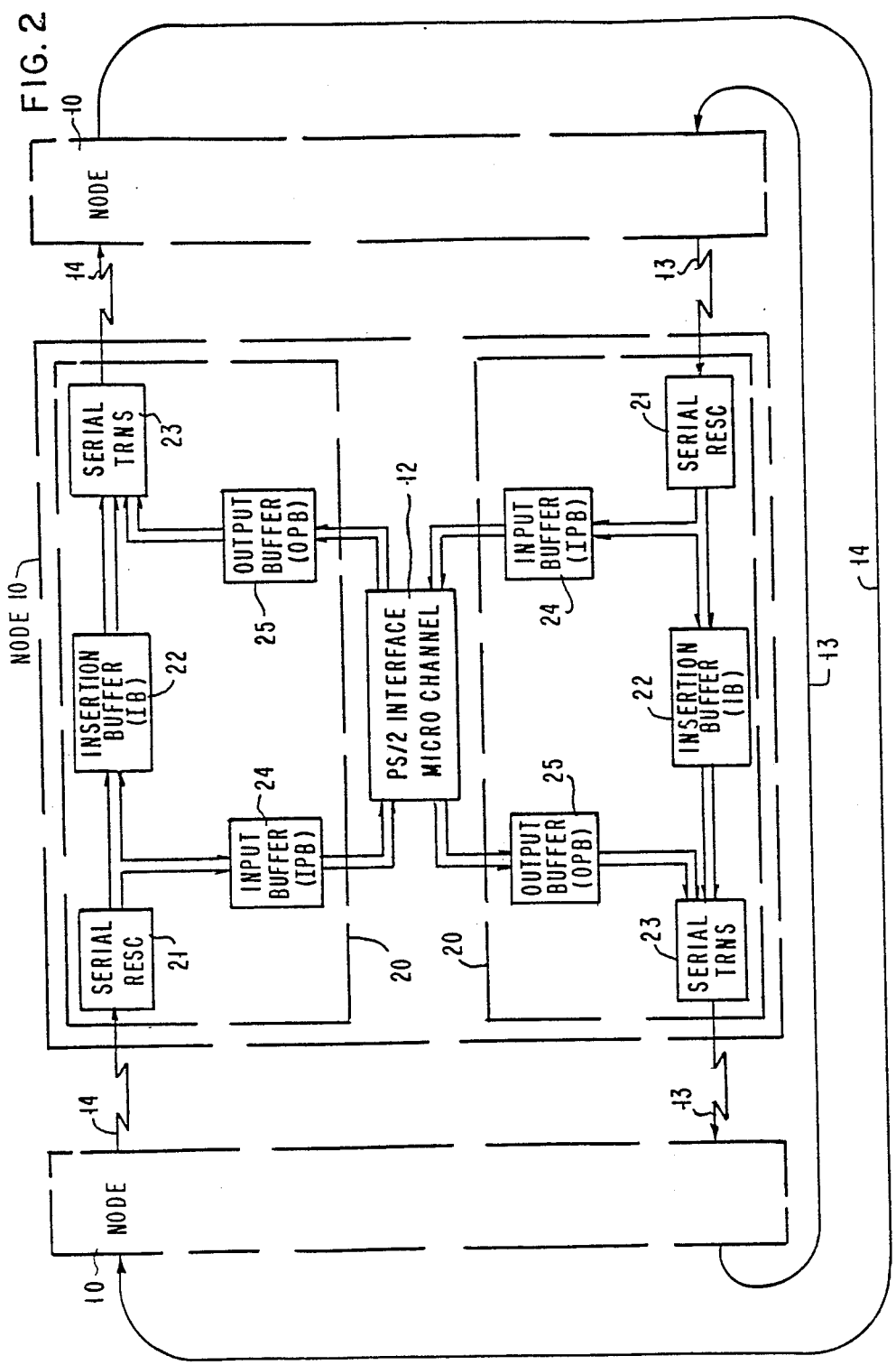
FIG. 2 schematically illustrates the buffer insertion interfaces on a node on the ring.
Figure 12:
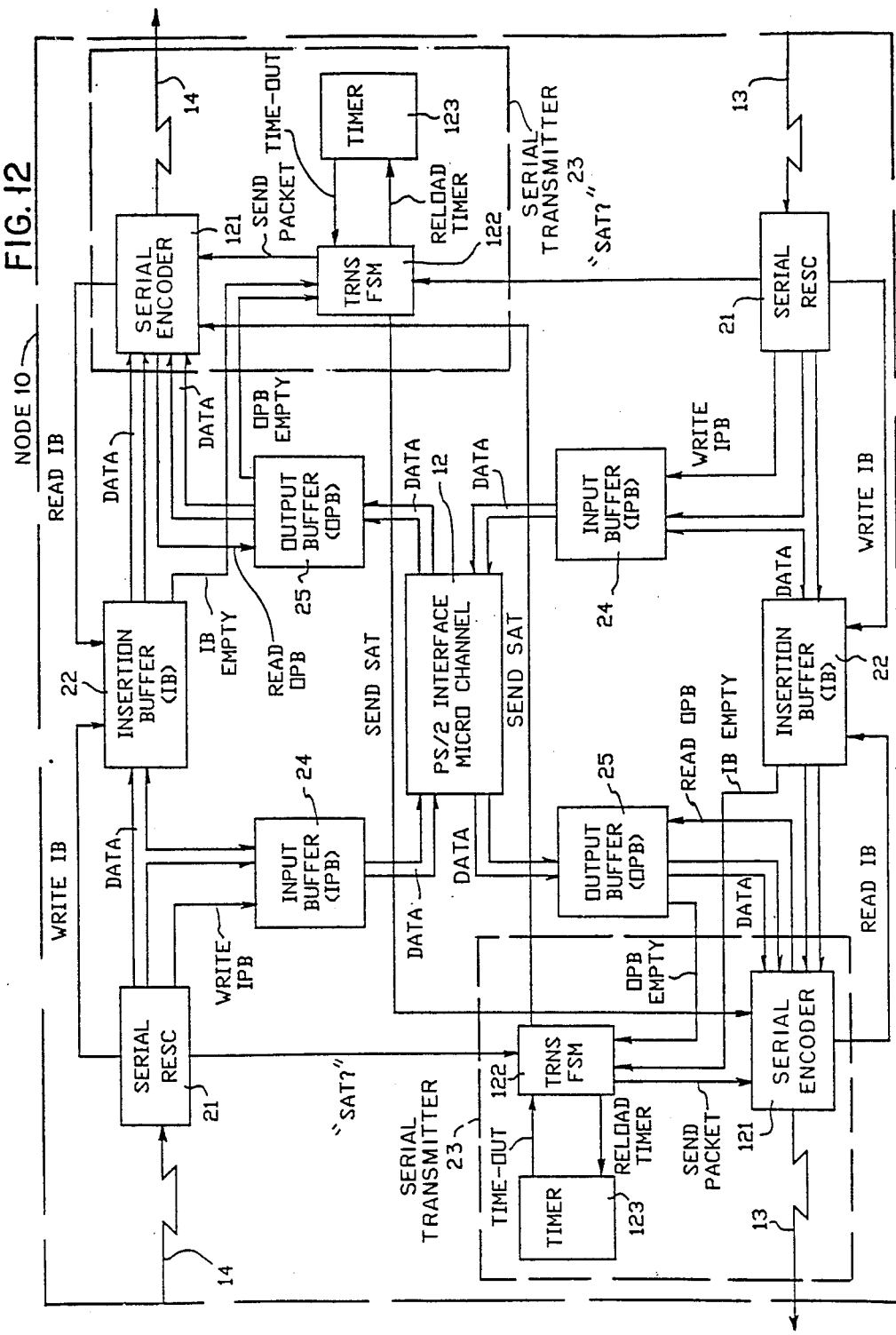
FIG. 12 is a more detailed schematic of a full-duplex interface 11 for a node of this invention.

Buffer insertion or register insertion is a distributed medium access technique that can be used in a unidirectional ring. FIG. 2 schematically illustrates two unidirectional buffer insertion interfaces 20, one is connected to the clockwise links 14 and the other interface is connected to the counter clockwise links 13. The two insertions interfaces make up the major portion of the full-duplex interface unit 11 of FIG. 1. Further details of the interface unit 11, along with various control signals, are shown in FIG. 12. On the receiving side of each link there is an insertion buffer (IB) 22, of the size of one maximal size packet. Via the host interface 12, the host reads and writes its packets using input buffer 24 and output buffer 25, respectively. Packet transmission from output buffer 25 can be started via the transmitter 23, only when the insertion buffer 22 is empty. If the ring traffic arrives at receiver 21 when the node is in the middle of a packet transmission, then the ring traffic will be accumulated in the insertion buffer 22 until this packet transmission is completed. The node can no longer transmit unless the insertion buffer 22 becomes idle again, i.e., a non-preemptive priority is given to the ring traffic. If the node is idle, the ring traffic will cut-through the insertion buffer 22. This means that a packet does not have to be completely received in the insertion buffer 22 before it is started to be forwarded.

If the received packet is destined to this node the receiver 21 will transfer the packet to the input buffer 24, then the packet is transferred to the host via the host interface 12. When the host has a packet for transmission it will transfer it to the output buffer 25 via the host interface 12.

Buffer insertion medium access control enables the concurrent or simultaneous transmission of packets. The example of FIG. 3 demonstrates the possible concurrent transmission from node 1 to 5, from 6 to 7, from 9 to 12, from 2 to 10 and from 8 to 6 at the same time.

Figure 3:
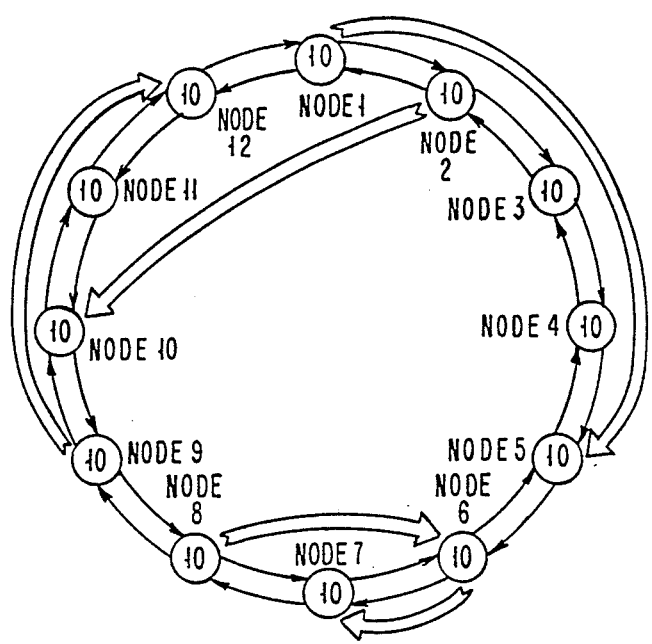
FIG. 3 schematically illustrates concurrent node transmission which could possibly lead to node starvation.

The concurrent transmission over the full-duplex ring does not guarantee a fair access, since an up-stream node can block a down-stream node. Under extreme traffic conditions a node can be unable to transmit for a very long time, i.e., a node can be starved. In FIG. 3 for example, if node 2 will transmit continuously to node 10 and if node 9 will transmit continuously to node 12, then node 11 will not be able to transmit.

Figure 4A:
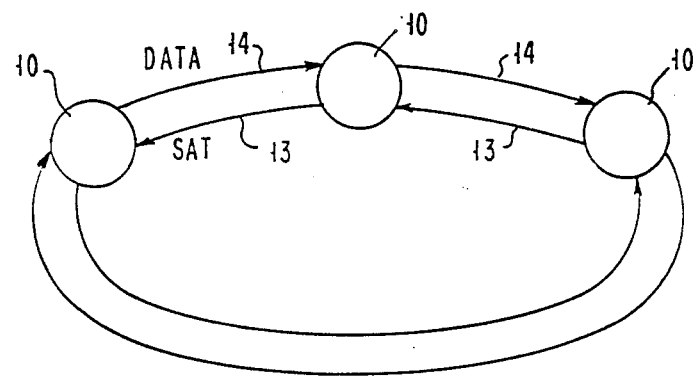
FIGS. 4A and 4B schematically illustrate the transmission of control messages and data in opposite directions on the full-duplex communications ring.
Figure 4B:
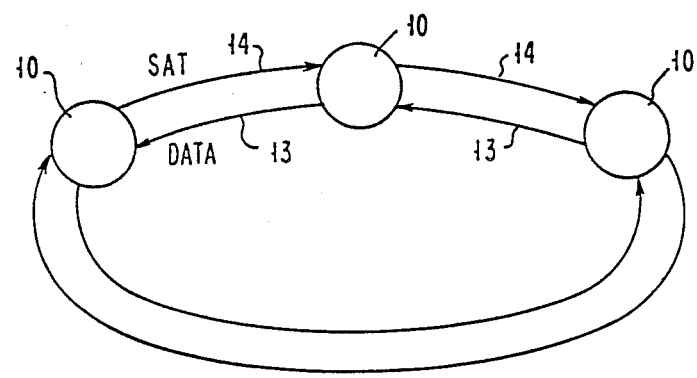

For regulating or balancing the data input in each direction of the ring a special control message, SAT, is used. The term "SAT message" and "control message" will be used interchangeably in this application. Each direction of the ring maintains its own SAT message, which is transferred from one node to its neighbor. In FIG. 4A, the data packets that are transferred in a clockwise direction via links 14, are regulated by a SAT control message which is transferred in the counter clockwise direction via links 13. For regulating the input data traffic in a counter clockwise direction over links 13, a SAT message, which flows clockwise in a clockwise direction over links 14, is used as shown in FIG. 4B.

The SAT message is transferred from one node to its neighbor. A node that receives a SAT can forward this message immediately or hold it until some conditions are satisfied. The various scenarios for forwarding or holding the SAT will be described later.

The SAT message has the following characteristics:
  Very short—few characters (possibly one).
  Preemptive priority—can be sent in the middle of a data packet.
  Non-distractive—does not damage the data packets which it preempts.

Figure 5A:
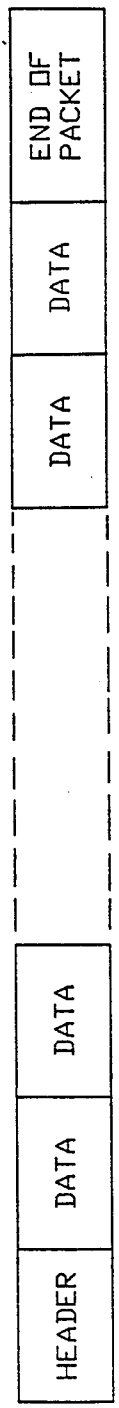
FIG. 5A schematically illustrates a packet.
Figure 5B:
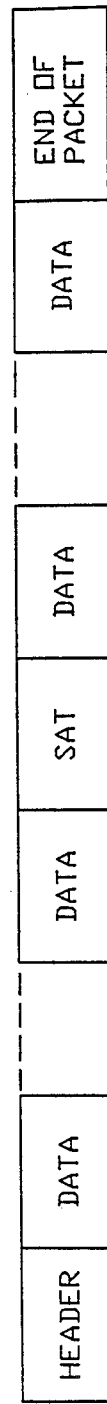
FIG. 5B shows a control message (SAT) being transmitted in the middle of a packet.

A packet can be sent over the serial link as a single continuous stream, as shown in FIG. 5A, or can be broken by a SAT (or SATs) message, as shown in FIG. 5B.

One way for implementing the transmission of a distinct SAT message is by using one of the unused serial codewords of the 4B/5B code. (The 4B/5B encoding scheme is a standard which is used in FDDI. In this scheme every 4 bits of data are transformed into a codeword of 5 bits, as shown in the table in FIG. 6. The unused codewords can be used for transmitting control information from one node to its neighbor. The same also applies to other codes that contains redundant codewords.

Figure 7:
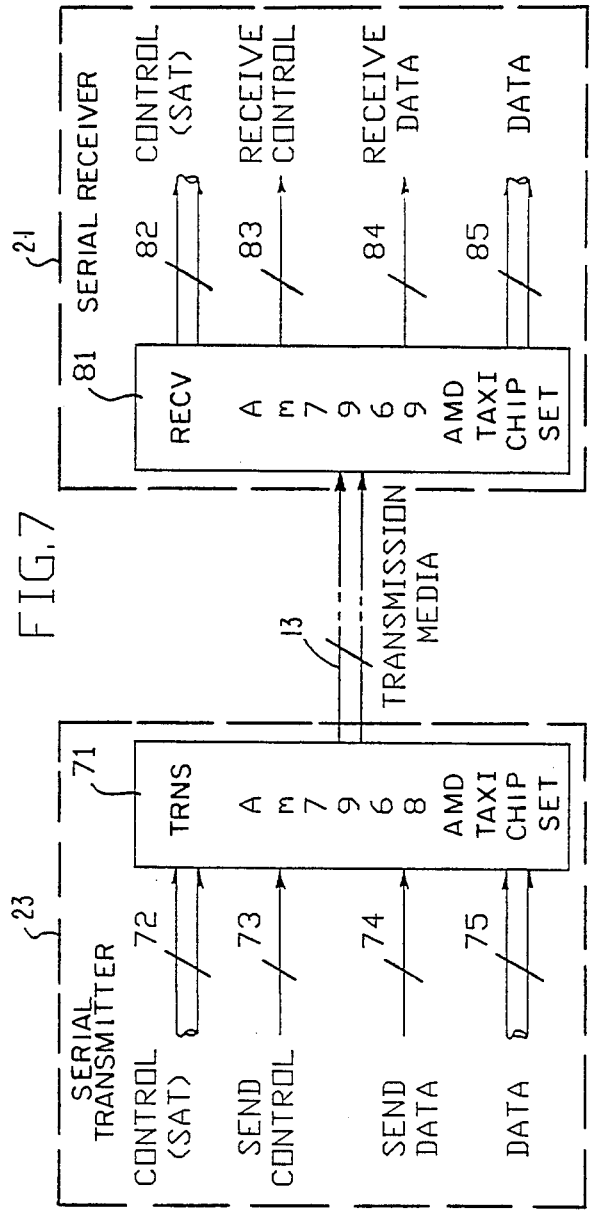
FIG. 7 schematically illustrates the serial communication channel, and the parallel-to-serial and serial-to-parallel converters.

Using the AMD TAXI chip set (transmitter am7968 71 and receiver am7969 81), it is possible to send distinct control codewords, as shown in FIG. 7. FIG. 7 shows that transmitter AM 7968 is part of the serial transmitter 23, and that receiver AM 7969 is part of the serial receiver 21. When the transmitter receives the SEND CONTROL command 73, a control codeword of 10 bits is sent after the current serial word has been sent. The codeword to be sent is determined by the CONTROL lines 72, and SAT is one of the possible codewords. The list of different control codewords is shown in the table in FIG. 8. The SAT control message can be selected from one of the 15 different codewords. For transmitting data the SEND DATA signal 74 is used, and then, 8 bits of data 75 enter the transmitter 71. The codewords (both control and data) are transmitted in a serial form via the transmission media 13 or 14 to the receiver 81. The receiver 81 decodes the incoming serial bit stream, when data is received the 8 bits are asserted on the data lines 85 with the RECEIVE DATA signal 84. When a control message is decoded, the control word is asserted on the control lines 82 with the RECEIVE CONTROL signal 83.

The buffer insertion access control does not enforce fairness on the access of nodes to the ring. Moreover, under the buffer insertion access control a node can be starved for unbounded time. Therefore, the access to the ring is regulated by the SAT control message in the following algorithm.

Send Packet Algorithm

Figure 9:
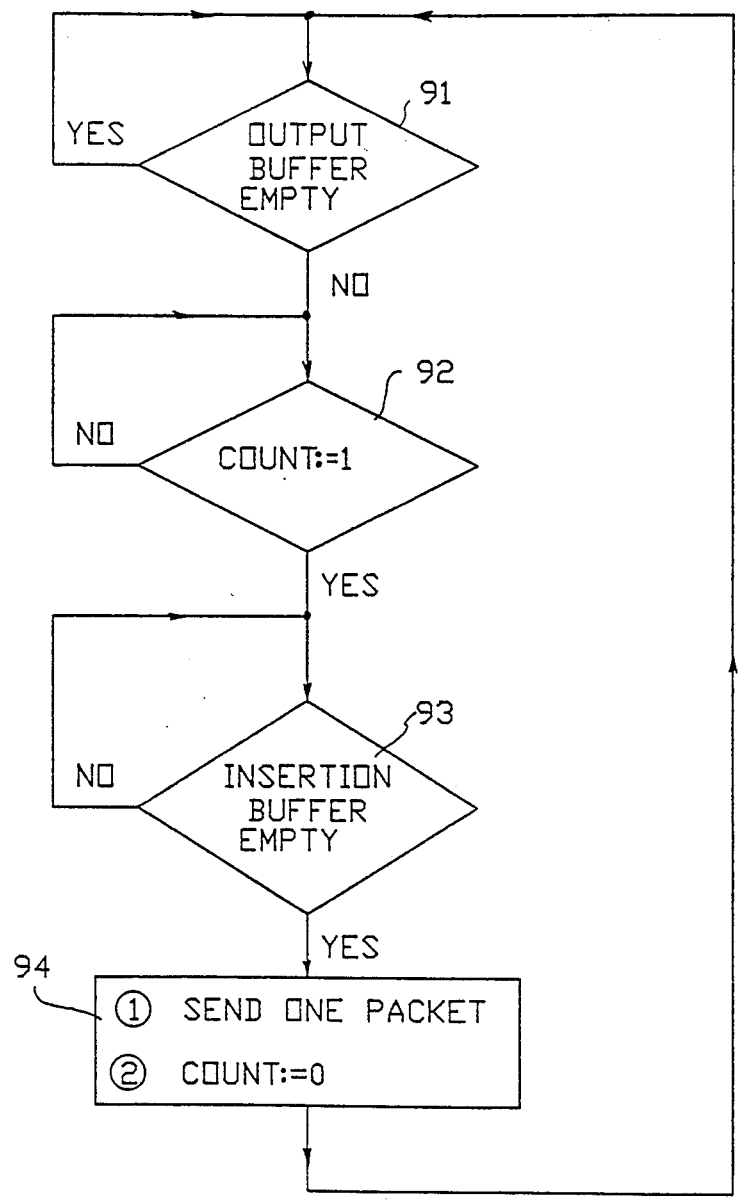
FIG. 9 is a flow chart illustrating how a control message controls the transmission of packets on a communications ring where the first corresponding maximum number of packets that the node is permitted to transmit is 1.

As shown in FIG. 9, the node can transmit a packet from its output buffer when it is not empty (91), only if the following two conditions are true (as shown in FIG. 9): (i) the variable COUNT is one (92), and (ii) the insertion buffer is empty 93. After the node transmits the packet, the COUNT variable is set to zero (94).

Figure 10:
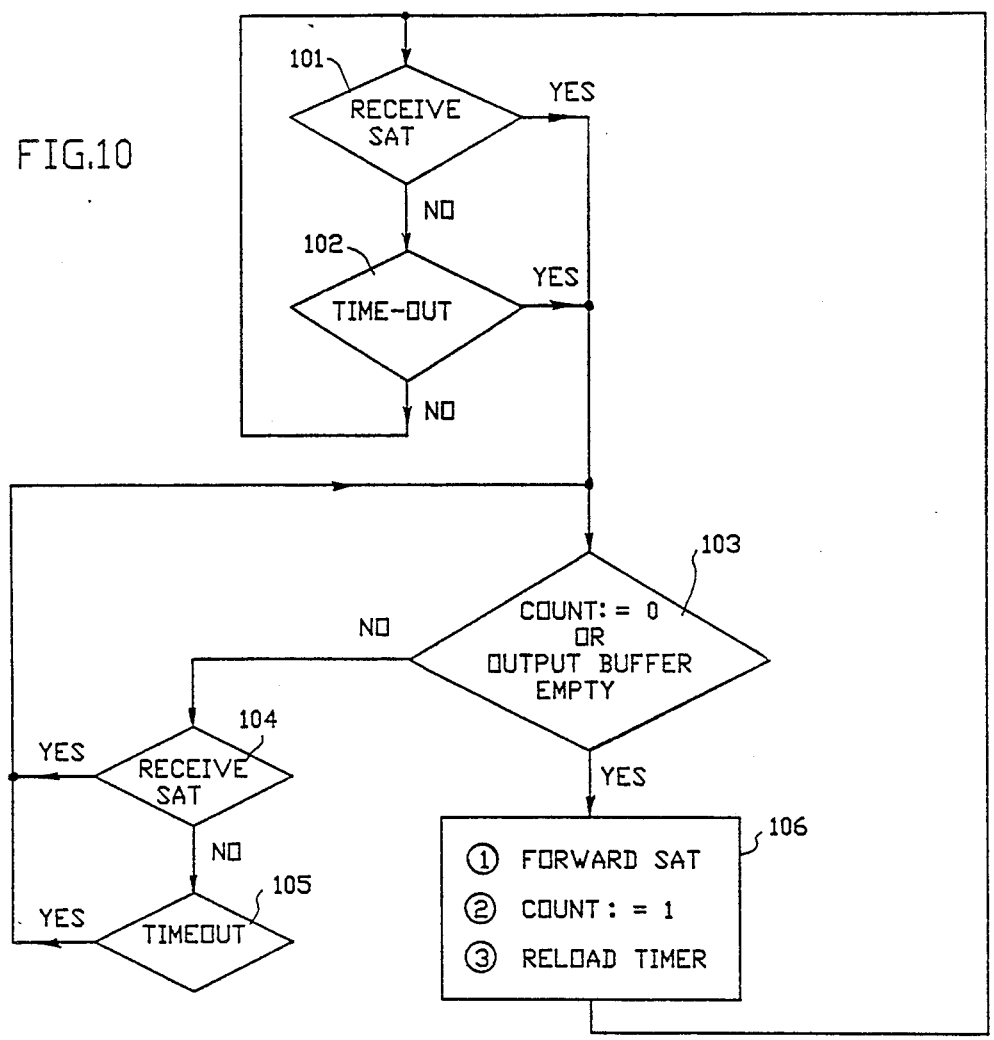
FIG. 10 is a flow chart illustrating how a node reacts to the reception of a control message. The node will forward the control message if the second corresponding number of packets has been transmitted.

FIG. 10 describes what the node does when it receives the SAT message (101). If the SAT message does not arrive after some maximum possible SAT rotation time has passed, time-out will occur (102). The node will react to the time-out as if it has received a SAT message (101). Then, the node will forward the SAT if the variable COUNT is zero (103) or if the output buffer 25 is empty. The node will hold the SAT if the variable COUNT is one (103) and the output buffer 25 is not empty. The node will hold the SAT until COUNT becomes zero (after one packet is transmitted). The node holds the SAT in order to prevent starvation. If during the time the node is holding the SAT another SAT arrives 104, the second SAT it will be discarded; and if time-out occurred 105, it will be ignored. After the node forwards the SAT, it will set the COUNT:=1 and reload the timer 106.

Figure 11:
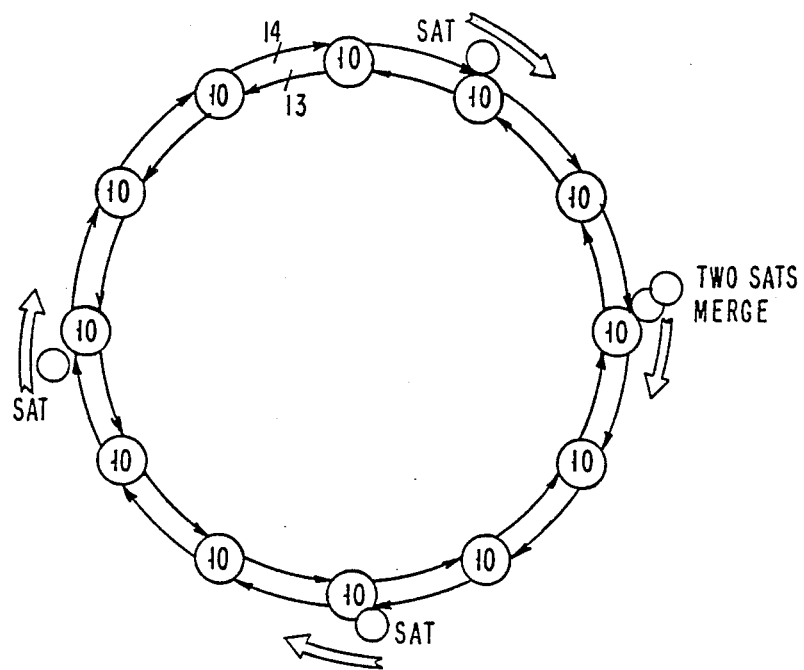
FIG. 11 schematically illustrates the situation of multiple control messages on the communications ring. When two control messages will arrive to the same node they will merge together.

FIG. 11 illustrates the situation of having more than one SAT message rotating in the same direction in the ring. When two SAT messages meet at the same node, the second SAT is discarded, i.e., the two SAT messages are merged together.

The time-out mechanism, and the ability to generate and merge multiple SAT messages are enhancements to the fairness algorithms so they can tolerate SAT loss and duplication. This fault tolerant mechanism is operating independently at any node. The timer is reloaded with its initial value any time a SAT message is received by the node. The node may start to decrement this timer when the SAT message is forwarded, and it will be decremented as long as the SAT message has not come back. The initial value of the timer is defined as the maximal time a node can wait before a SAT message is received. Another mechanism that might be employed is the addition of a random delay to the generation of the SAT. This may reduce the probability of multiple SATs.

FORMAL DESCRIPTION OF THE FAIRNESS ALGORITHMS

The following is a formal description of various mechanisms for fairness. Each node maintains two variables:

COUNT is used to count the number of messages sent from the last reception of the SAT message.

HOLD_SAT which identifies if the node is currently holding the SAT message.

In addition the node may check the following conditions:

INSERTION-BUFFER which can be EMPTY or not EMPTY.

OUTPUT-BUFFER which can be EMPTY or not EMPTY.

SAT-ROTATION-TIME the time it takes for the SAT to complete one round (each node measure this time independently).

Each of the following algorithms has an event driven description. In this description a large dot corresponds to an event and the statements following each event are its corresponding actions. Each event is executed in one undisturbed step, i.e., an atomic action. In the following description of the algorithms the SAT messages are forwarded up-stream and the data packets are sent down-stream.

The Simple Fairness Algorithm

This is a formal description of the algorithm which was described in FIG. 9 and FIG. 10. In this algorithm the node can send one packet down-stream after the SAT was forwarded up-stream, and the node will hold the SAT if since the previous SAT it couldn't send a packet and it has a packet to send. A more generalized version of this algorithm will be described below as the general fairness algorithm.

The Algorithm for Node i

- For SAT message from node i − 1-
    If(COUNT = 0 or OUTPUT-BUFFER = EMPTY), then
        COUNT:=1;
        Send SAT to node i + 1;
        HOLD_SAT:=0;
        Reload timer;
    Else-if(COUNT=1 and OUTPUT-BUFFER not EMPTY), then
        HOLD_SAT:=1;
- OUTPUT-BUFFER becomes not EMPTY
    If(COUNT=1 and INSERTION-BUFFER=EMPTY), then
        Send one packet down-stream (node i −1 direction);
        COUNT:=0;
- INSERTION-BUFFER becomes EMPTY (node i does not transmit)
    If(COUNT=1 and OUTPUT-BUFFER not EMPTY), then
    Start to send packet down-stream (node i−1 direction);
    If HOLD_SAT=1 then
        Reload timer;
    Else COUNT: = 0;
- TIME-OUT occured (the timer value reaches zero)
    COUNT:=1;
    Send SAT to node i + 1;
    HOLD_SAT=0;
    Reload timer;

General Fairness Algorithm

The previous mechanism for regulating the traffic into the ring can be generalized as follows. Between two successive SAT messages (or each SAT round) the node can transmit at most the first predefined corresponding maximum number of k (k≧1) packets, and at least the second predefined corresponding number of l (k≧l≧1) packets (if it has l packets in its OUTPUT-BUFFER). In the simple fairness algorithm described above k=l=1.

The nodes will forward the SAT message (control message) only if it is SATisfied, and the following condition is defined:

The node is SATisfied—if between two SAT messages the node has sent at least l packets (a second corresponding number of packets), or if all packets in the node's output buffer, at the time the previous SAT was sent up-stream, were transmitted.

The node will forward the SAT message according to the following algorithm:

The General Fairness Algorithm (Informal)

DO when receive the SAT message:
    If the node is SATisfied, then forward SAT up-stream,
    else, hold until SATisfied (then forward SAT up-stream).

After a node forwards SAT it can send k more packets, k≧l (a simple case k=l=1).

The following is the formal event driven description of the general algorithm.

General Fairness Algorithm for Node i

- For SAT message from node i-1 -
    If(COUNT ≦ k-l or OUTPUT-BUFFER = EMPTY), then
        Execute Proc_A
    Else if(COUNT > k-l and OUTPUT-BUFFER not EMPTY), then
        HOLD_SAT: = 1;
- For end of packet transmission
    If HOLD_SAT: = 0, then
        If (OUTPUT-BUFFER not EMPTY and
        INSERTION-BUFFER = EMPTY and COUNT > 0), then
            Execute Proc_B
    Else
        If (OUTPUT-BUFFER not EMPTY and
        INSERTION-BUFFER = EMPTY), then
            Execute Proc_B
        If(COUNT = k-l or OUTPUT-BUFFER = EMPTY), then
            Execute Proc_A
- OUTPUT-BUFFER becomes not EMPTY
    If(COUNT > 0 and INSERTION-BUFFER = EMPTY), then
        Execute Proc_B
- INSERTION-BUFFER becomes EMPTY and node i does not transmit
    If HOLD_SAT: = 0, then
        If(COUNT > 0 and OUTPUT-BUFFER not EMPTY), then
            Execute Proc_B
    Else
        If(COUNT > k-l and OUPUT-BUFFER not EMPTY),
        then
            Execute Proc_B
            If(COUNT = k -l then
                Execute Proc_A
- TIME-OUT occured (the timer value reaches zero)
    Execute Proc_A
Proc_A
    COUNT: = k;
    Send SAT to node i + 1;
    HOLD_SAT: = 0;
    Reload timer;
Proc_B
    Start to send packet down-stream(node i-l direction)
    COUNT: = COUNT-1;

Note that in the above algorithm, requiring that the insertion buffer be empty could be changed to requiring that the insertion buffer have less than a predetermined number of packets.

Average Fairness Algorithm

This algorithm is another generalization of the simple algorithm. In this case the number of packets the node can transmit depends on how many it already sent in previous rounds. Each time the node receives SAT it may increment COUNT by m, as long as its value does not exceed $+k_{max}$. During each SAT round the node can transmit if its COUNT is not less than $-k_{min}$. A node will hold the SAT message if its COUNT is greater than zero; otherwise, it will forward it immediately.

The Average Algorithm for Node i

- For SAT message from node $i-1$ -
  - If(COUNT $\leq$ 0 or OUTPUT-BUFFER = EMPTY), then
    - Execute Proc__A
  - Else-if (COUNT > 0 and OUTPUT-BUFFER not EMPTY), then
    - HOLD__SAT: = 1;
- For end of packet transmission
  - If HOLD__SAT: = 0, then
    - If (OUPUT-BUFFER not EMPTY and INSERTION-BUFFER = EMPTY and COUNT > $-k_{min}$), then
      - Execute Proc__B
    - Else
      - If (OUTPUT-BUFFER not EMPTY and INSERTION-BUFFER = EMPTY), then
        - Execute Proc__B
      - If(COUNT = 0 or OUTPUT-BUFFER = EMPTY), then
        - Execute Proc__A
- OUTPUT-BUFFER becomes not EMPTY
  - If(COUNT > $-k_{min}$ and INSERTION-BUFFER = EMPTY), then
    - Execute Proc__B
- INSERTION-BUFFER becomes EMPTY and node $i$ does not transmit
  - If HOLD__SAT: = 0, then
    - If(COUNT > $-k_{min}$ and OUTPUT-BUFFER not EMPTY), then
      - Execute Proc__B
    - Else
      - If(COUNT > 0 and OUTPUT-BUFFER not EMPTY), then
        - Execute Proc__B
      - If COUNT: = 0 then
        - Execute Proc__A
- TIME-OUT occured (the timer value reaches zero)
  - Execute Proc__A Proc__A
  COUNT:=min{$k_{max}$, COUNT+m};
  Send SAT to node $i+1$;
  HOLD__SAT:=0;
  Reload timer;

PROC__B
  Start to send packet down-stream
  COUNT:=COUNT-1;

Adaptive Fairness Algorithm

This algorithm is a more specific example of the general fairness algorithm. In this case the values of the first and second predetermined numbers, k and l, are computed according to the current value of the parameter SAT-ROTATION-TIME. The idea is that when the SAT-ROTATION-TIME decreases l and k may be increased and vice versa. The actual function should be determined by analysis, simulation and/or experiments.

Shown in FIG. 12 is a schematic illustration of a full-duplex interface 11 between an IBM PS/2 host and a full-duplex ring. How the node transmits a packet following the buffer insertion protocol was described above in the discussion of FIG. 2. Here, it is shown how the various fairness mechanisms are embedded in the full-duplex interface.

The fairness algorithm is performed by the transmitter finite state machine (TRNS FSM) 122. Each TRNS FSM 122 controls the packet transmission on one direction of the ring. When the TRNS FSM asserts the SEND PACKET signal to the serial transmitter (SERIAL TRNS) 121, then one packet will be sent. The TRNS FSM receives three status lines from the direction it is controlled:

1. IB EMPTY—insertion buffer empty, which indicates the state of the insertion buffer 22.
2. OPB EMPTY—output buffer empty, which indicates the status of the output buffer 25.
3. TIME-OUT—the maximum SAT rotation time which was loaded into the timer 123 has expired.

In addition the TRNS FSM receives the "SAT?" signal from the serial receiver (SERIAL RESC) 21. The "SAT?" signal indicates to the TRNS FSM that a SAT control message was received in the opposite direction. If the TRNS FSM is in a satisfied state, it will assert the SEND SAT signal to the SERIAL TRNS 121 in the opposite direction, so SERIAL ENCODER will forward the SAT up-stream. If the TRNS FSM is not in a satisfied state, SERIAL ENCODER will hold the SAT until TRNS FSM enters a satisfied state, and then, TRNS FSM will assert the SEND SAT signal to the SERIAL ENCODER 121 in the opposite direction, so it will forward the SAT up-stream. After the TRNS FSM forwards a SEND SAT signal, it enters an unsatisfied state.

If the TIME-OUT signal from the timer 123 is asserted the, TRNS FSM will assert the SEND SAT signal to the SERIAL ENCODER 121 in the opposite direction so it will forward the SAT up-stream, i.e., a new SAT message is created. If the TRNS FSM receives two SATs before it enters the satisfied state, then the second SAT is ignored, i.e., the two SATs merge.

The SEND PACKET signal is asserted if the TRNS FSM is not in a satisfied state and if both the insertion and output buffer are not empty. After a packet is sent, the TRNS FSM checks if it is satisfied or not.

The SERIAL RESC 21 identifies the destination of an incoming packet. If the packet is destined to this node the packet is written into the INPUT BUFFER (IPB) 24 by using the WRITE IPB signal. If the packet is not destined to this node the packet is written into the INSERTION BUFFER (IB) 22, by using the WRITE IB signal.

The SERIAL ENCODER 121 can read data from the INSERTION BUFFER 22 by using the READ IB signal, and can read data from the OUTPUT BUFFER 25 by using the READ OPB signal.

Having thus described our invention, what we claim as new and desire to secure by Letters Patent is:

1. In a communications ring having a number of nodes, a method of regulating the transmission of packets from said nodes comprising the steps of:
   a. forwarding a current control message on said ring indicating to each of said nodes a first corresponding maximum number of packets that said each node is permitted to transmit in a corresponding time interval; and
   b. holding, by said each node, a subsequent control message when received by each node until said each node has transmitted at least a second corresponding number of packets, or until said each node has transmitted all packets that it has to transmit if the number of said all packets is less than its said second corresponding number of packets.

2. In a communications ring having a number of nodes, a method of regulating the transmission of packets from said nodes comprising the steps of:
  a. forwarding a current control message on said ring indicating to each of said nodes a first corresponding maximum number of packets that said each node is permitted to transmit in a corresponding time interval from when it receives said current control message to when it forwards a subsequent control message; and
  b. holding, by said each node, said subsequent control message when received by said each node until said node has transmitted at least a second corresponding number of packets or until said each node has transmitted all packets that it has to transmit if the number of packets that it has to transmit is less than its said second corresponding number.

3. In a buffer insertion ring having a number of nodes with each node having insertion buffers, a method of regulating the transmission of packets from said nodes to prevent starvation on said ring, said method comprising the steps of:
  a. forwarding a current control message on said ring indicating to said each node a first corresponding maximum number of packets that said each node is permitted to transmit in a time interval from when it receives said current control message to when it forwards a subsequent control message; and
  b. holding, by said each node, said subsequent control message when received by said each node until said each station has transmitted at least a second corresponding number of packets, or until each said node has transmitted all packets in its output buffer if the number of said all packets is less than said each node's said second corresponding number of packets;
  said each node transmitting packets as long as its insertion buffer has less than a predetermined number of bits therein and as long as said each node has not transmitted more than its first corresponding number of packets during said interval, said each node transmitting packets without having to hold any of said control messages at the time it transmits a packet.

4. A method as recited in claim 3, wherein the transmission of packets in one direction is regulated by current and subsequent control messages forwarded in the opposite direction on a bidirectional ring.

5. A method as recited in claim 3, wherein the transmission of packets in one direction is regulated by current and subsequent control messages forwarded in the same direction on a bidirectional ring.

6. A method as recited in claim 3, wherein the transmission of packets in one direction is regulated by current and subsequent control messages forwarded in the same direction on a unidirectional ring.

7. A method as recited in claim 3, wherein, for each of said nodes, each said first corresponding maximum number indicated to said each node equals each said second corresponding number indicated to said each node.

8. A method as recited in claim 3, wherein, for each said nodes, each said first corresponding maximum number is greater than said second corresponding number.

9. A method as recited in claim 3, wherein said first corresponding maximum number and said second corresponding number are functions of control message rotation time.

10. A method as recited in claim 3, wherein, for each of said nodes, each said first corresponding maximum number and each said second corresponding number is equal to one.

11. A method as recited in claim 3, wherein a control message is transmitted from each of said nodes that has not received a control message after a predetermined length of time has elapsed.

12. A method as recited in claim 3, wherein a control message is discarded if it is received by one of said nodes already holding a control message.

13. A method as recited in claim 3, wherein said each node will transmit said current or subsequent control message with preemptive priority, that is even during the transmission of a packet from said each node without waiting until after said each node has completed transmission of said packet on said ring.

14. A method as recited in claim 3, wherein said each node will transmit said current and subsequent control message with non-preemptive priority, that is after the transmission of a packet from said each node and not during the transmission of said packet from said each node on said ring.

15. A method as recited in claim 3, wherein each packet transmitted on said ring is cut through each insertion buffer of said ring, that is bits of said each packet are forwarded from said each insertion buffer without waiting for all the bits of said each packet to be stored in said each insertion buffer.

16. A method as recited in claim 3, wherein each packet transmitted on said ring is stored and forwarded through each insertion buffer of said ring, that is none of the bits of said each packet are transmitted from said each insertion buffer until all the bits of said each packet are stored in said each insertion buffer.

17. In a buffer insertion ring having a number of nodes with each node having insertion buffers, a method of regulating the transmission of packets from said nodes to prevent starvation on said ring, said method comprising the steps of:
  a. forwarding a current control message on said ring indicating to said each node a first corresponding maximum number of packets that said each node is permitted to transmit in a time interval from when in receives said current control message to when it forwards a subsequent control message; and
  b. holding, by said each node, said subsequent control message when received by said each node until said each station has transmitted at least a second corresponding number of packets, or until each said node has transmitted all packets in its output buffer, that were stored therein during a selected time interval, if the number of said all packets is less than said each node's said second corresponding number of packets;.
  said each node transmitting packets as long as its insertion buffer has less than a predetermined number of bits therein and as long as said each node has not transmitted more than its first corresponding number of packets during said interval, said each node transmitting packets without having to hold any of said control messages at the time it transmits a packet.

18. In a full duplex buffer insertion ring having a number of nodes with each node having an insertion buffer, a method of regulating the transmission of packets from said nodes to prevent starvation on said rings, said method comprising the steps of:

a. forwarding a current control message on said ring indicating to each of said nodes a first corresponding maximum number of packets that said each node is permitted to transmit in a corresponding time interval from when it receives current control message to when it forwards a subsequent control message, said current and said subsequent control message being transmitted in the opposite direction of corresponding said packets of data;

b. holding, by said each node, said subsequent control message when received by said each node until each station has transmitted at least a second corresponding number of packets, or until each said node has transmitted all packets in its output buffer if the number of said all packets is less than its said second corresponding number of packets;

said each node transmitting packets as long as its insertion buffer has less than a predetermined number of bits therein and as long as said each node has not transmitted more than its first corresponding number of packets during said interval, said each node transmitting packets without having to hold any of said control messages at the time it transmits a packet.

19. A node for a communications ring for regulating the transmission of packets from said node and on said ring, said node comprising:

means for transmitting packets on said ring;

means for forwarding a current control message on said ring indicating to each of said nodes a first corresponding maximum number of packets that said each node is permitted to transmit in a time interval from when it receives said current control message to when it forwards a subsequent control message; and means for holding said subsequent control message when received by said each node until said each station has transmitted all packets that it has to transmit if the number of said all packets is less than said second corresponding number of packets.

20. A buffer insertion communications ring, comprising:

a plurality of nodes, each node comprising
an insertion buffer;
means for forwarding a current control message on said ring indicating to each of said nodes a first corresponding number of packets that said each node is permitted to transmit in a time interval from when it receives said current control message to when it forwards a subsequent control message; and means for holding said subsequent control message when received by said each node until said each station has transmitted at least a second corresponding number of packets, or until each said node has transmitted all packets that it has to transmit if the number of said all packets is less than said second corresponding number of packets, with each said node transmitting no more than said first corresponding number of packets in said time interval, said each node transmitting packets as long as its said insertion buffer has less than a predetermined number of bits therein, and with said each node transmitting packets without having to hold any of said control messages at the time it transmits a packet.

* * * * *